United States Patent
Akiyama et al.

(10) Patent No.: US 7,682,274 B2
(45) Date of Patent: *Mar. 23, 2010

(54) REINFORCING CORD FOR RUBBER REINFORCEMENT AND RUBBER PRODUCT INCLUDING THE SAME

(75) Inventors: Mitsuharu Akiyama, Minato-Ku (JP); Keisuke Kajihara, Minato-Ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 990 days.

This patent is subject to a terminal disclaimer.

(21) Appl. No.: 10/550,865

(22) PCT Filed: Apr. 7, 2004

(86) PCT No.: PCT/JP2004/005037

§ 371 (c)(1),
(2), (4) Date: Sep. 26, 2005

(87) PCT Pub. No.: WO2004/090224

PCT Pub. Date: Oct. 21, 2004

(65) Prior Publication Data

US 2007/0098983 A1    May 3, 2007

(30) Foreign Application Priority Data

Apr. 9, 2003    (JP)    ............................. 2003-105709

(51) Int. Cl.
*F16G 1/08*    (2006.01)
*B32B 25/10*    (2006.01)

(52) U.S. Cl. ........................ 474/260; 428/375; 428/377; 428/392; 57/210; 57/229; 57/240; 57/241; 474/261; 474/263; 474/264

(58) Field of Classification Search .................... 57/210, 57/224, 229–232, 234
See application file for complete search history.

(56) References Cited

U.S. PATENT DOCUMENTS

| | | | | |
|---|---|---|---|---|
| 4,677,818 | A  * | 7/1987 | Honda et al. | 57/224 |
| 6,539,698 | B2 * | 4/2003 | Fidan et al. | 57/6 |
| 6,601,378 | B1 * | 8/2003 | Fritsch et al. | 57/238 |
| 7,060,326 | B2 * | 6/2006 | Hiel et al. | 427/384 |
| 7,080,500 | B2 * | 7/2006 | Akiyama et al. | 57/212 |
| 7,179,522 | B2 * | 2/2007 | Hiel et al. | 428/300.7 |
| 7,211,319 | B2 * | 5/2007 | Hiel et al | 428/300.7 |

(Continued)

FOREIGN PATENT DOCUMENTS

CA    2 430 881 A1    2/2003

(Continued)

OTHER PUBLICATIONS

Supplemental European Search Report, dated Jul. 3, 2007.

*Primary Examiner*—Jill Gray
(74) *Attorney, Agent, or Firm*—Hamre, Schumann, Mueller & Larson, P.C.

(57) ABSTRACT

A reinforcing cord of the present invention is a reinforcing cord for rubber reinforcement. The reinforcing cord includes a carbon fiber strand (11) and a plurality of glass fiber strands (12) arranged around the carbon fiber strand (11). The present invention makes it possible to obtain a reinforcing cord having sufficient tensile strength for reinforcing rubber products as well as high dimensional stability and bending fatigue resistance.

10 Claims, 2 Drawing Sheets

U.S. PATENT DOCUMENTS

| | | | |
|---|---|---|---|
| 7,404,426 B2 * | 7/2008 | Akiyama et al. | 152/536 |
| 2004/0131834 A1 * | 7/2004 | Hiel et al. | 428/292.1 |
| 2004/0131851 A1 * | 7/2004 | Hiel et al. | 428/375 |
| 2004/0226641 A1 * | 11/2004 | Akiyama et al. | 152/451 |
| 2005/0091960 A1 | 5/2005 | Akiyama et al. | |
| 2005/0129942 A1 * | 6/2005 | Hiel et al. | 428/375 |
| 2005/0227067 A1 * | 10/2005 | Hiel et al. | 428/364 |
| 2007/0028583 A1 * | 2/2007 | Kajihara | 57/210 |
| 2007/0128435 A1 * | 6/2007 | Hiel et al. | 428/375 |
| 2007/0144134 A1 * | 6/2007 | Kajihara | 57/229 |
| 2008/0233380 A1 * | 9/2008 | Hiel et al. | 428/299.4 |

FOREIGN PATENT DOCUMENTS

| | | |
|---|---|---|
| CA | 2 474 651 A1 | 10/2003 |
| CA | 2 486 975 A1 | 12/2003 |
| CN | 1659322 A | 8/2005 |
| JP | 58-41921 A | 3/1983 |
| JP | 58-61603 U | 4/1983 |
| JP | 59-168197 | 9/1984 |
| JP | 63-175195 | 11/1988 |
| JP | 3-174045 A | 7/1991 |
| JP | 8-174708 | 7/1996 |
| JP | 2000-27082 A | 1/2000 |
| JP | 2004-11076 A | 1/2004 |
| WO | WO 03/080907 A1 * | 10/2003 |
| WO | WO03080907 * | 10/2003 |

* cited by examiner

REINFORCING CORD FOR RUBBER REINFORCEMENT AND RUBBER PRODUCT INCLUDING THE SAME

TECHNICAL FIELD

The present invention relates to a reinforcing cord for rubber reinforcement and a rubber product including the same used therein.

BACKGROUND ART

Reinforcing fibers such as glass fibers and aramid fibers have been used as reinforcing materials of rubber products such as rubber belts and tires. These rubber products, however, are subjected to bending stress repeatedly and thereby the performance thereof tends to deteriorate due to bending fatigue. As a result, exfoliation tends to occur between the reinforcing fibers and a rubber matrix, or a deterioration in strength tends to occur due to fraying of the reinforcing fibers. Accordingly, the reinforcing fibers to be used for such rubber products are required to have high bending fatigue resistance.

On the other hand, a timing belt that is used for driving a camshaft of an internal combustion engine of an automobile is required to have high dimensional stability to keep suitable timing. Furthermore, rubber belts that are used for auxiliary drive of an injection pump or power transmission in industrial machines are required to have high strength and high elasticity.

In order to fulfill the above-mentioned requirements, reinforcing cords including specific reinforcing fibers have been used conventionally. For instance, high-strength glass fibers and polyparaphenylene terephthalamide fibers (aramid fibers) have been used as the reinforcing fibers. Recently, carbon fibers and fibers made of polyparaphenylene benzobisoxazole also are used. For example, JP8(1996)-174708A proposes carbon fibers to be used as a tension member of a toothed belt. Cords for rubber reinforcement are required to have various characteristics such as high strength, high elasticity, as well as bending flexibility and fraying resistance. However, conventional reinforcing materials including one type of reinforcing fibers used therein have difficulties in achieving a balance between strength and bending resistance. For instance, a reinforcing cord including carbon fibers used as reinforcing fibers has high strength and high elasticity but low bending resistance and therefore has a problem in that its strength tends to deteriorate through bending.

DISCLOSURE OF THE INVENTION

With the above-mentioned situations in mind, one of the objects of the present invention is to provide a reinforcing cord having a high tensile strength that is sufficient to reinforce rubber products as well as high dimensional stability and bending fatigue resistance. Another object of the present invention is to provide a rubber product including the reinforcing cord used therein.

In order to achieve the above-mentioned objects, a reinforcing cord of the present invention is a reinforcing cord for rubber reinforcement and includes a carbon fiber strand and a plurality of glass fiber strands arranged around the carbon fiber strand.

The rubber product of the present invention includes a rubber part and a reinforcing cord embedded in the rubber part, wherein the reinforcing cord is the above-mentioned reinforcing cord of the present invention.

The present invention makes it possible to obtain a reinforcing cord having high tensile strength that is sufficient to reinforce rubber products as well as high dimensional stability and bending fatigue resistance. The rubber product of the present invention including the afore-mentioned cord used therein has high performance and excellent durability.

BEST MODE FOR CARRYING OUT THE INVENTION

Figure 1:
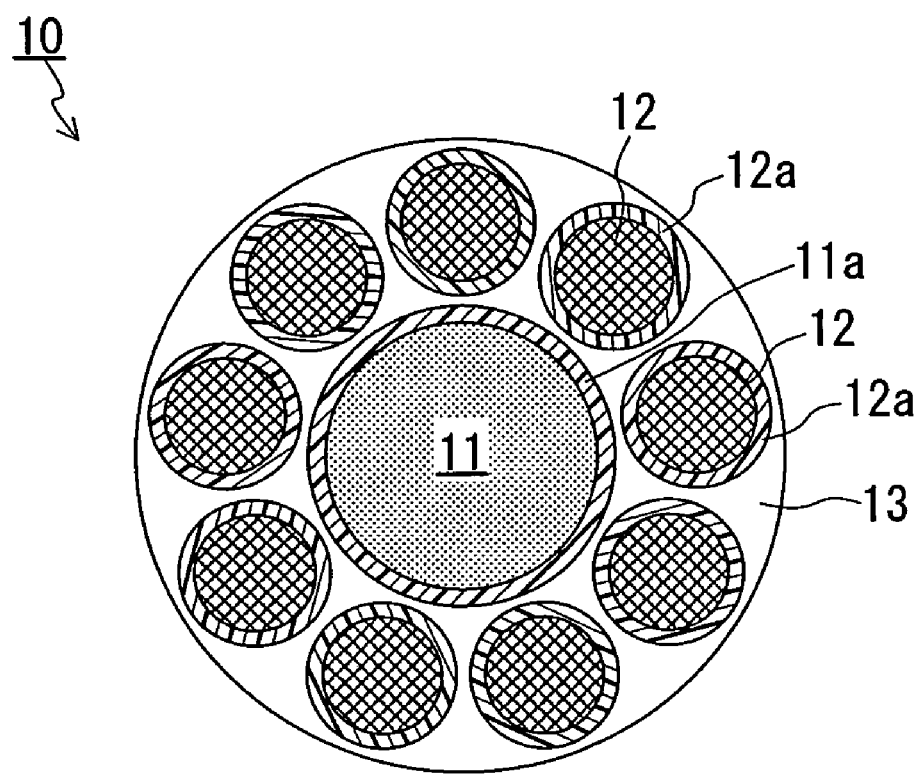
FIG. 1 is a cross-sectional schematic view showing an example of the reinforcing cord according to the present invention.

Embodiments of the present invention are described below.

Reinforcing Cord

The reinforcing cord of the present invention includes a carbon fiber strand and a plurality of glass fiber strands arranged around the carbon fiber strand.

The carbon fiber strand typically is formed of carbon fibers alone but may include other fibers as long as the effects of the present invention can be obtained. The ratio of the carbon fibers contained in the carbon fiber strand is generally 99 wt. % or more and typically 100 wt. %.

The glass fiber strands typically are formed of glass fibers alone but may include other fibers as long as the effects of the present invention can be obtained. The ratio of the glass fibers contained in the glass fiber strand is generally 99 wt. % or more and typically 100 wt. %.

Typically, the fiber strands of the reinforcing cord according to the present invention are formed only of a carbon fiber strand and glass fiber strands. The fiber strands, however, may include a strand formed of other fibers as long as the effects of the present invention can be obtained. The ratio of the total of the cross section of the carbon fiber strand and the cross section of the glass fiber strands to the total cross section of all fiber strands is generally 95% or more and typically 100%.

The carbon fiber strand arranged in the central part of the cord provides the cord with high tensile strength and excellent dimensional stability according to its properties. In order to obtain a reinforcing cord having high bending fatigue resistance, the reinforcing cord is required to have a structure that relaxes tensile stress and compressive stress when the cord and matrix rubber reinforced with the cord are bent. The glass fiber strands have a lower elastic modulus and high fraying resistance as compared to the carbon fiber strand. When the carbon fiber strand is surrounded by such glass fiber strands, the tensile stress and compressive stress can be relaxed and thus a reinforcing cord with high bending fatigue resistance can be obtained. Such an effect cannot be obtained when carbon fibers and glass fibers simply are mixed together to form a strand. The reinforcing cord of the present invention is a hybrid cord in which a carbon fiber strand and glass fiber strands are used in combination in special arrangements. The reinforcing cord of the present invention is excellent in strength, dimensional stability, and bending fatigue resistance. Furthermore, since the glass fiber strands generally have higher adhesiveness to rubber than that of the carbon fiber strand, the reinforcing cord of the present invention is excellent in adhesiveness to rubber.

A carbon fiber strand whose modulus of elongation is in the range of 155 to 650 GPa can be used suitably as the carbon fiber strand. Such a carbon fiber strand has a density of, for instance, 1.74 to 1.97 g/cm$^3$. Particularly, a strand having 30 to 2000 tex that is formed of a bundle of 500 to 25000 carbon filaments with diameters of 4 μm to 8 μm is used suitably.

Preferably, the total cross section of the carbon fiber strand is in the range of 20% to 80% of the total of the total cross section of the carbon fiber strand and that of the glass fiber strands. The carbon fiber strand arranged in the center of the cord contributes to obtaining high tensile strength and excellent dimensional stability. However, if the ratio of the carbon fiber strand in the cord is too high, the static strength may increase but the flexibility may deteriorate in some cases. Accordingly, the total cross section of the carbon fiber strand is preferably 80% or less (more preferably 70% or less) of the total of the total cross section of the carbon fiber strand and that of the glass fiber strands. On the other hand, if the ratio of the carbon fiber strand in the cord is too low, the effects to be provided by the carbon fiber strand may be insufficient in some cases. The total cross section of the carbon fiber strand therefore is preferably at least 20% (more preferably at least 40%) of the total of the total cross section of the carbon fiber strand and that of the glass fiber strands.

The carbon fiber strand may be twisted or untwisted. Preferably, the twist number of the carbon fiber strand is 5.0 times/25 mm or less, i.e. the twist number per 25 mm is 5.0 times or less. More preferably, the twist number of the carbon fiber strand is 2.5 times/25 mm or less.

The surface of the carbon fiber strand may be subjected to a treatment for improving its adhesiveness or a treatment for preventing fibers from fraying. For instance, the surface of the carbon fiber strand may be provided with a coating layer containing rubber formed thereon or an adhesive applied thereto. Such a coating layer can be formed using a treatment solution (hereinafter also referred to as a "RFL treatment solution") containing, as its main component, a rubber latex and a mixture of an initial condensate of resorcinol and formalin, for example. The initial condensate of resorcinol and formalin can be one of those known well. For example, condensates that can be used include a resol-type condensate that is obtained by allowing resorcinol and formaldehyde to react to each other in the presence of an alkaline catalyst (for instance, alkali hydroxide) and a novolak-type condensate that is obtained by allowing resorcinol and formaldehyde to react to each other in the presence of an acid catalyst. In addition, the treatment for improving the adhesiveness of the surface of the glass fiber strand may be carried out using, for instance, an epoxy compound or an isocyanate compound.

A glass fiber strand whose elastic modulus is 60 to 80 GPa is used suitably for the glass fiber strands. Such a glass fiber strand has a density of about 2.5 g/cm$^3$ and a tensile strength of 250 to 310 cN/dtex (280 to 350 gf/d). For instance, filaments of E-glass fibers or filaments of high strength glass fibers may be employed as the glass fibers to be used for the glass fiber strands. A glass fiber strand to be used preferably for the glass fiber strands is a strand that has a size in the range of 20 to 480 tex and that is obtained by bundling 200 to 2400 glass filaments (with diameters of, for instance, 7 μm to 9 μm) and then primarily twisting them.

Since the glass fiber strands are arranged near the outer circumference of the cord, their adhesiveness to the matrix rubber in which the cord is to be embedded is an important issue. The adhesiveness of the glass fiber strands to the matrix rubber can be improved by twisting the glass fiber strands or subjecting the glass fiber strands to a treatment for improving the adhesiveness.

The surfaces of the glass fiber strands may be treated with a treatment solution (a RFL treatment solution) containing, as its main component, a mixture of a rubber latex and a condensate of resorcinol and formalin. This allows the glass fiber strands to have improved bending fatigue resistance and to have improved adhesiveness to rubber. A coating layer containing rubber may be formed on the surfaces of the glass fiber strands by another method. Furthermore, an adhesive may be applied to the surfaces of the glass fiber strands. For instance, a treatment for improving the adhesiveness of the surfaces of the glass fiber strands may be carried out using an epoxy compound or an isocyanate compound.

The glass fiber strand may have been primarily twisted to have a twist number in the range of 0.25 to 5.0 times/25 mm. The twist number set within this range allows the bending fatigue resistance to improve. When the glass fiber strand has been primarily twisted, the reinforcing cord may be finally twisted in the direction opposite to that of the primary twist of the glass fiber strands. This configuration decreases the degree of untwisting.

When both the carbon fiber strand and the glass fiber strand are primarily twisted, they may be primarily twisted in the same direction.

The reinforcing cord of the present invention may be finally twisted. In that case, it is preferable that the final twist number be in the range of 0.5 to 10 times/25 mm.

A coating layer (an overcoating layer) containing rubber may be formed on the surface of the reinforcing cord of the present invention. Preferably, this coating layer is selected according to the type of the matrix rubber in which the cord is to be embedded. For instance, when the matrix rubber is a rubber of a hydrogenated nitrile rubber type, the coating layer is formed preferably using a treatment solution containing chlorosulfonated polyethylene rubber (CSM).

FIG. 1 shows an example of the reinforcing cord according to the present invention. In FIG. 1, a cord 10 includes a carbon fiber strand 11 arranged in the central part, a plurality of glass fiber strands 12 arranged around the carbon fiber strand 11, and an overcoating layer 13 (hatching is omitted) formed to cover all the strands. A coating layer 11a is formed on the surface of the carbon fiber strand 11 while coating layers 12a are formed on the surfaces of the glass fiber strands 12. The coating layers 11a and 12a as well as the overcoating layer 13 may be omitted.

Figure 2:
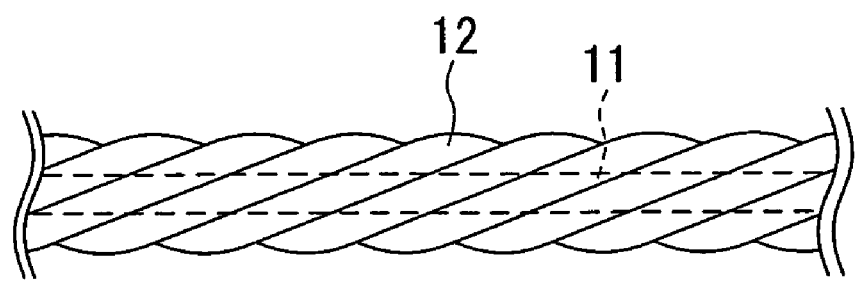
FIG. 2 is a schematic view showing an example of the configuration of the reinforcing cord according to the present invention.

FIG. 2 schematically shows the arrangement of the carbon fiber strand 11 and the glass fiber strands 12 that is obtained when the reinforcing cord of the present invention is finally twisted. In this case, the plurality of glass fiber strands 12 are arranged spirally around the carbon fiber strand 11.

The number of the carbon fiber strand 11 and that of the glass fiber strands 12 are determined according to the characteristics required for the cord or the characteristics of the strands. Preferable examples of the ratio of [the number of carbon fiber strands]:[the number of glass fiber strands] include 1:3 to 30, 2:6 to 30, and 3:10 to 40. When a plurality of carbon fiber strands are to be arranged in the central part, they may be bundled and then may be twisted or may be untwisted.

A carbon fiber strand often has lower adhesiveness to a matrix rubber as compared to a glass fiber strand. Hence, it is preferable that the plurality of glass fiber strands be arranged to surround the carbon fiber strand so as to prevent the carbon fiber strand from being in contact with the matrix rubber.

The cord of the present invention can be manufactured by well-known methods. An example of the method of manufacturing the cord according to the present invention is described below.

Fiber strands may be formed by bundling fiber filaments. The strand may be primarily twisted. A plurality of strands may be bundled and twisted to form one strand. The strand thus formed may be subjected to a specific treatment, for instance, a treatment using a RFL treatment solution.

When a coating layer is formed using the RFL treatment solution, the strand may be immersed in the RFL treatment solution and then may be heat-treated. The type of the rubber latex that is used in the RFL treatment solution is not particularly limited. Examples of the rubber latex that can be used herein include an acrylic rubber latex, an urethane rubber latex, a styrene-butadiene rubber latex, a nitrile rubber latex, a chlorosulfonated polyethylene latex, modified latices thereof, and mixtures thereof. The coating layer may be formed using a common adhesive such as, for instance, an epoxy compound or an isocyanate compound.

The carbon fiber strand and the glass fiber strands can be bundled by a well-known method. For instance, they can be bundled using a guide having a center guide hole and a plurality of peripheral guide holes arranged around the center guide hole. The plurality of peripheral guide holes are arranged at equal intervals around the center of the center guide hole.

One carbon fiber strand or a plurality of carbon fiber strands are put into the center guide hole. The carbon fiber strand(s) may have been primarily twisted or untwisted. The glass fiber strands are put into the peripheral guide holes. Preferably, the glass fiber strand has been primarily twisted. These strands are finally twisted to be bundled. The twist number employed in the final twist is preferably about 0.5 to 10 times/25 mm. The direction of the final twist may be the same as or opposite to that of the primary twist of the glass fiber strands. When the final twist and the primary twist are carried out in the same direction, i.e. to result in a so-called Lang lay, a cord with higher bending fatigue resistance can be obtained.

The apparatus to be used for manufacturing the cord of the present invention is not specified. Various apparatuses can be used including a ring twister, a flyer twisting frame, a strander, etc.

When the above-mentioned treatment agent alone does not allow the reinforcing cord to have sufficiently high adhesiveness to the matrix rubber, another adhesive further may be applied to the surface of the cord or a rubber coating layer (an overcoating layer) may be formed on the surface of the cord. The rubber coating layer can improve the affinity between the cord and the matrix rubber. Rubbers that can be used for the rubber coating layer includes hydrogenated nitrile rubber, chlorosulfonated polyethylene rubber (CSM), chloroprene rubber, natural rubber, urethane rubber, etc. These rubbers can be used together with a crosslinking agent. Generally, the rubber to be used for the rubber coating layer is selected from well-known rubbers according to the type of the matrix rubber. The weight of the rubber coating layer is not particularly limited but is preferably 2.0 wt. % to 10.0 wt. % with respect to the weight of the cord with no rubber coating layer having been formed thereon.

The cord of the present invention can be used for reinforcing various rubber products and rubber members. The cord of the present invention is particularly suitable for reinforcing rubber crawlers or rubber belts such as toothed belts or moving belts. The reinforcing cord of the present invention may be used in the form of one rope or in the form of a sheet-like reinforcer. The sheet-like reinforcer can be obtained by loosely bonding a plurality of the cords arranged in parallel with each other.

Rubber Products

The rubber product of the present invention includes a rubber part and a reinforcing cord embedded in the rubber part, wherein the reinforcing cord is the above-mentioned reinforcing cord of the present invention. The present invention is applicable to various rubber products and rubber members, for example, rubber belts such as toothed belts and moving belts, rubber crawlers, tire cords, etc.

In the rubber product of the present invention, it is preferable that the ratio of the reinforcing cord of the present invention to the whole be in the range of 10 wt. % to 70 wt. %. The quantity and arrangement of the reinforcing cord of the present invention are determined according to the characteristics required for the rubber product.

Figure 3:
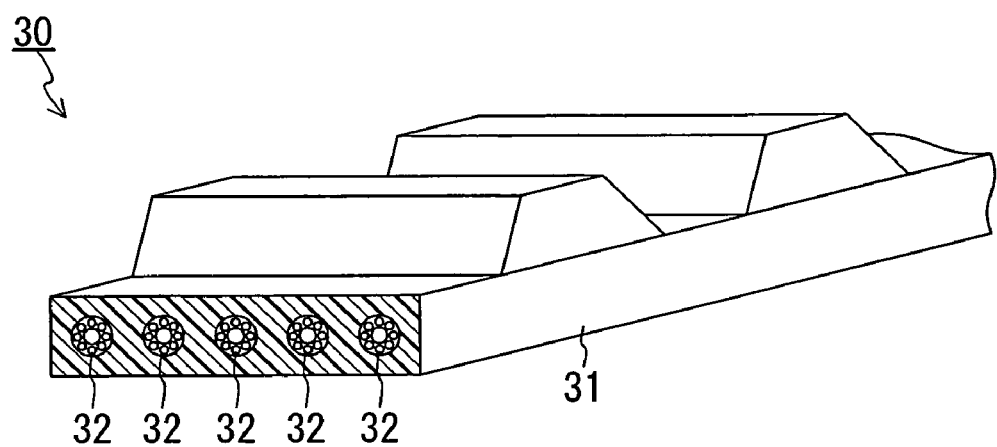
FIG. 3 is an exploded perspective view showing an example of the rubber product according to the present invention.

An example of the rubber product of the present invention is described below. FIG. 3 shows an exploded perspective view of a toothed belt 30. The toothed belt 30 includes a body 31 and a plurality of cords 32 embedded in the body 31. The body 31 is formed of rubber or rubber and another material. The cords 32 are reinforcing cords according to the present invention and are arranged in parallel with each other in the direction in which the toothed belt 30 moves. A well-known member can be used for the part other than the cords 32.

EXAMPLES

The present invention is described below further in detail using examples.

Example 1

A carbon fiber strand was impregnated with a RFL treatment solution and then was heat-treated (at 180° C. for 120 seconds) to be dried. A carbon fiber strand provided with a coating layer thus formed (the coating layer: 20 wt. %) was produced. The carbon fiber strand used herein was a carbon fiber strand (having 400 tex, an outer diameter of about 0.76 mm, an elastic modulus of 235 GPa, and a density of about 1.76 g/cm$^3$; an untwisted product, manufactured by Toho Tenax Co., Ltd.) formed of a bundle of 6000 carbon fiber filaments (with a diameter of 7.0 μm). The RFL treatment solution used herein was a mixture obtained by mixing a solution of a resorcinol formalin condensate (with a solid content of 8 wt. %), a vinylpyridine-styrene-butadiene latex (with a solid content of 40 wt. %), and a chlorosulfonated polyethylene rubber dispersion (with a solid content of 40 wt. %) at a solid-content weight ratio of 2:13:6.

In addition, glass fiber strands (having about 100 tex, an outer diameter of about 0.35 mm, an elastic modulus of 70 GPa, a density of about 2.5 g/cm$^3$, and a coating layer of 20 wt. %) were prepared that were provided with a coating layer formed thereon. The glass fiber strands were produced as follows. That is, after a strand formed by bundling 600 glass fiber filaments (with an E-glass composition and a diameter of 9 μm) was impregnated with the RFL treatment solution and then was heat-treated (dried at 180° C. for 120 seconds) to be dried, the strand was primarily twisted (2.0 times/25 mm) in the S direction.

Next, as shown in FIG. 1, nine glass fiber strands were arranged around one carbon fiber strand, which then was finally twisted (2.0 times/25 mm) in the Z direction. Thus, a first cord (with a diameter of about 1.15 mm) was obtained. In the first cord, the ratio of the cross section of the carbon fiber strand was 34% of the total of the cross section of the carbon fiber strand and the total cross section of the glass fiber strands. Furthermore, the linear density of the first cord was 1650 tex, i.e. its weight per length 1000 m was 1650 g.

A treatment agent for overcoating with the composition indicated in Table 1 was applied to the first cord and then was dried. As a result, a second cord with an overcoating layer thus formed was obtained. The weight of the overcoating layer was 5 wt. % of the first cord.

TABLE 1

| Components | Ratio (Weight Parts) |
|---|---|
| Chlorosulfonated Polyethylene Rubber (CSM) (manufactured by Toso Co., Ltd., Product Name TS-340; a chlorine content is 43 wt. %, and a sulfur content is 1.1 wt. %) | 5.25 |
| P-dinitrosobenzene | 2.25 |
| Carbon Black | 3.0 |
| Mixed Solvent of Xylene and Trichloroethylene (the weight ratio between xylene and trichloroethylene = 1.5:1.0) | 85.0 |

The second cord was subjected to measurements of tensile strength per cord and elongation (%) at break. Furthermore, the tensile load applied per cord was measured when the elongation in length of the cord reached 0.4% through application of a tensile load to the cord. A greater tensile load applied at the time of the elongation indicates better dimensional stability. The initial tensile strength was 710 N/cord. The elongation at break was 2.7%. The tensile load was 110 N/cord.

In addition, one second cord was interposed between two rubber sheets (with a width of 10 mm, a length of 300 mm, and a thickness of 1 mm), which then was subjected to press vulcanization from its both sides at 150° C. for 20 minutes. Thus, a belt-like sample was produced. The rubber sheets were formed of a blend of the components indicated in Table 2.

TABLE 2

| Components | Ratio (Weight Parts) |
|---|---|
| Hydrogenated Acrylonitrile-Butadiene Rubber (Zetpol 2020, manufactured by JAPAN ZEON Corporation) | 100 |
| Zinc Oxide, Grade 1 | 5 |
| Stearic Acid | 1.0 |
| HAF Carbon | 60 |
| Trioctyl Trimellitate | 10 |
| 4,4-(α,α-Dimethylbenzyl)-diphenylamine | 1.5 |
| 2-Mercaptobenzimidazole Zinc Salt | 1.5 |
| Sulfur | 0.5 |
| Tetramethylthiuramsulfide | 1.5 |
| Cyclohexyl-Benzothiazylsulfenamide | 1.0 |

Figure 4:
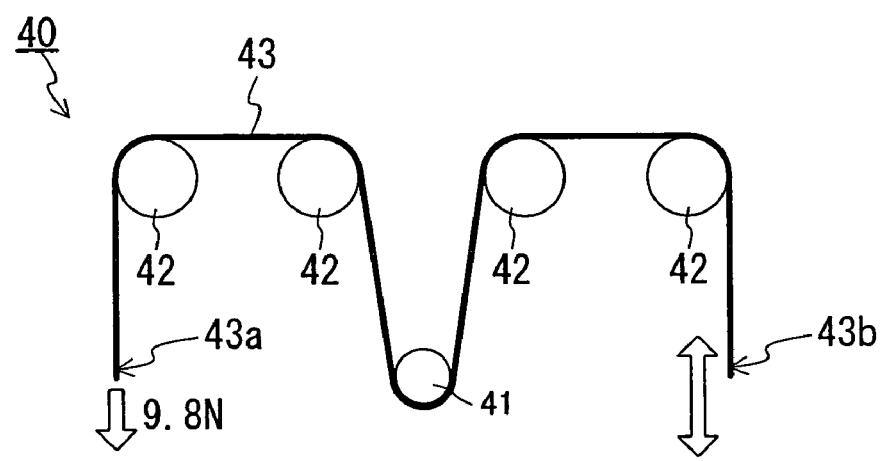
FIG. 4 is a schematic view showing a method of a bending test.

Next, the sample thus obtained was subjected to a bending test using a bending tester 40 shown in FIG. 4. The bending tester 40 includes a flat pulley 41 with a diameter of 25 mm, a motor (not shown in FIG. 4), and four guide pulleys 42. First, the sample 43 produced in the above was hung on the five pulleys. A weight was attached to one end 43a of the sample 43 to apply an initial tensile force of 9.8 N to the sample 43. In that state, the other end 43b of the sample 43 was made to reciprocate 10000 times at a moving distance of 10 cm in the directions indicated with the double-headed arrow, and thereby the sample 43 was bent repeatedly around the flat pulley 41. The bending test was carried out at room temperature. Thus, the sample 43 was subjected to the bending test and then the tensile strength of the sample was measured after the bending test. The tensile strength retention (%) of the sample obtained after the bending test was determined, with the tensile strength of the sample obtained before the bending test being taken as 100%. A higher value of the tensile strength retention indicates higher bending fatigue resistance. The tensile strength retention of the sample according to Example 1 was 83%.

Example 2

First, a carbon fiber strand with a coating layer was produced and then was primarily twisted (2.0 times/25 mm) in the S direction as in Example 1. The carbon fiber strand thus obtained was used for a first cord (with a diameter of 1.18 mm). Except for that, the first cord was produced by the same method as in Example 1. The linear density of the first cord was 1770 tex, i.e. its weight per length 1000 m was 1770 g.

Next, an overcoating layer was formed on the surface of the first cord as in Example 1. Thus, a second cord with the overcoating layer was obtained. The weight of the overcoating layer was 5 wt. % of the first cord. This second cord was evaluated as in Example 1. Furthermore, a sample to be used for the bending test was produced and then was subjected to the bending test as in Example 1.

As a result, the initial tensile strength per cord was 1080 N/cord. The elongation at break was 2.1%. The tensile load applied per cord when the elongation was 0.4% was 200 N/cord. Furthermore, the tensile strength retention obtained after the bending test was 71%.

Comparative Example 1

In Comparative Example 1, a cord was produced using no carbon fiber strand. Specifically, the glass fiber strands used in Example 1, i.e. glass fiber strands that had been subjected to the RFL treatment and then had been primarily twisted in the S direction, were prepared first. Then, 11 glass fiber strands thus prepared were bundled and then were finally twisted (2.0 times/25 mm) in the Z direction. Thus, a first cord (with a diameter of about 1.13 mm) including no carbon fiber was obtained. The linear density of the first cord was 1440 tex, i.e. its weight per length 1000 m was 1440 g.

Next, an overcoating layer was formed on the surface of the first cord as in Example 1. Thus, a second cord with the overcoating layer was obtained. The weight of the overcoating layer was 5 wt. % of the cord. This second cord was evaluated as in Example 1. Furthermore, a sample to be used for the bending test was produced and then was subjected to the bending test as in Example 1.

As a result, the initial tensile strength per cord was 890 N/cord. The elongation at break was 3.4%. The tensile load applied per cord when the elongation was 0.4% was 80 N/cord. Furthermore, the tensile strength retention obtained after the bending test was 51%.

Comparative Example 2

In Comparative Example 2, a cord was produced using no glass fiber strands. Specifically, first, carbon fiber strands (having 800 tex, an elastic modulus of 240 GPa, and a density of about 1.80 g/cm$^3$; an untwisted product, manufactured by Toho Tenax Co., Ltd.) formed of a bundle of 12000 carbon fiber filaments (with a diameter of 6.9 μm) were twisted (2.0 times/25 mm). Thereafter, a treatment agent for overcoating was applied thereto and then was dried. Thus, a cord (with a diameter of 1.10 mm) with an overcoating layer was obtained. The linear density of this cord was 1140 tex, i.e. its weight per length 1000 m was 1140 g. The weight of the overcoating layer was 5 wt. % of the cord. This cord was evaluated as in Example 1. Furthermore, a sample to be used for the bending test was produced and then was subjected to the bending test as in Example 1.

As a result, the initial tensile strength per cord was 1440 N/cord. The elongation at break was 2.1%. The tensile load applied per cord when the elongation was 0.4% was 90 N/cord. Furthermore, the tensile strength retention obtained after the bending test was 68%.

Table 3 indicates the type of the strands, the linear density, the tensile load applied when the elongation was 0.4%, and the tensile strength retention with respect to Examples 1 and 2 as well as Comparative Examples 1 and 2.

when it is finally twisted in the Z direction, the degree of the primary twist of the carbon fiber strand (that has been primarily twisted in the S direction) decreases and thereby the primary twist mostly is cancelled. Conceivably, the difference in degree of such twists may cause the difference in performance between the cord of Example 1 and the cord of Example 2. Accordingly, it is preferable that after the final twist, the carbon fiber strand have a substantial twist number in the range of 0.5 to 5.0 times/25 mm when the bending fatigue resistance is considered as important and have a substantial twist number of less than 0.5 time/25 mm (including the case where the carbon fiber strand is untwisted) when the dimensional stability is considered as important.

The present invention is applicable to other embodiments as long as they do not depart from the intention and essential characteristics thereof. The embodiments disclosed in this

TABLE 3

| | Constituent Fibers of Strand (the Number of Strands) | | Linear Density | Tensile Load at the Time of Elongation | Tensile Strength Retention after Bending Test |
|---|---|---|---|---|---|
| | Center | Periphery | [g/1000 m] | [N/cord] | [%] |
| Example 1 | Carbon Fiber (1) | E-Glass Fiber (9) | 1650 | 110 | 83 |
| Example 2 | Carbon Fiber (1) | E-Glass Fiber (9) | 1770 | 200 | 71 |
| Comparative Example 1 | E-Glass Fiber (11) | — | 1440 | 80 | 51 |
| Comparative Example 2 | Carbon Fiber (2) | — | 1140 | 90 | 68 |

As is clear from Table 3, in the case of the cords of Examples 1 and 2, the tensile load applied when the elongation was 0.4% was greater and the tensile strength retention was higher. Accordingly, the cords of Examples 1 and 2 were excellent in dimensional stability and bending fatigue resistance. On the other hand, in the case of the cord of Comparative Example 1 in which the glass fiber strands alone were used as reinforcing fibers, both the tensile load applied at the time of elongation and the tensile strength retention were lower. Hence, the cord of Comparative Example 1 was inferior to the cords of Examples 1 and 2 in terms of both the dimensional stability and the bending fatigue resistance. Furthermore, the cord of Comparative Example 2 in which carbon fiber strands alone were used as reinforcing fibers was superior to the cord of Comparative Example 1 but was inferior to the cords of Examples 1 and 2 in terms of the tensile load at the time of elongation and the tensile strength retention.

The cord of Example 1 had a higher tensile strength retention after the bending test and a less tensile load at the time of elongation as compared to the cord of Example 2. Hence, the cord of Example 1 is superior in bending fatigue resistance to the cord of Example 2. On the other hand, the cord of Example 2 is superior in dimensional stability to the cord of Example 1.

Generally, in the case of a twisted cord, the bending fatigue resistance improves with an increase in twist number while the dimensional stability improves with a decrease in twist number. In the case of the cord of Example 1, when it is finally twisted in the Z direction, the carbon fiber strand (that has not been primarily twisted) also is twisted. As a result, the carbon fiber strand is twisted in the Z direction at about 2.0 times/25 mm. On the other hand, in the case of the cord of Example 2, specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

According to the present invention, a reinforcing cord can be obtained that has sufficient tensile strength for reinforcing rubber products as well as high dimensional stability and bending fatigue resistance. The cord is applicable to various rubber products. Particularly, the cord is used suitably for rubber products that are required to have high dimensional stability and high bending fatigue resistance. For instance, the cord is used suitably for toothed belts such as timing belts, and rubber crawlers.

The invention claimed is:

1. A rubber belt comprising a rubber part and a reinforcing cord embedded in the rubber part, wherein the reinforcing cord comprises a carbon fiber strand and a plurality of glass fiber strands arranged around the carbon fiber strand, and
a coating layer containing a rubber is formed on the carbon fiber strand.

2. The rubber belt according to claim 1, wherein the total cross section of the carbon fiber strand is in a range of 20% to 80% of the total of the total cross section of the carbon fiber strand and the total cross section of the glass fiber strands.

3. The rubber belt according to claim 1, wherein the carbon fiber strand has a twist number of 5.0 times/25 mm or less.

4. The rubber belt according to claim 1, wherein surfaces of the glass fiber strands have been treated with a treatment solution containing, as its main components, a rubber latex and a condensate of resorcinol and formalin.

5. The rubber belt according to claim 1, wherein the glass fiber strands have been primarily twisted at a twist number in a range of 0.25 to 5.0 times/25 mm.

6. The rubber belt according to claim 5, wherein the reinforcing cord has been finally twisted in an opposite direction to a direction in which the glass fiber strands have been primarily twisted.

7. The rubber belt according to claim 1, wherein the carbon fiber strand and the glass fiber strands have been primarily twisted in the same direction.

8. The rubber belt according to claim 1, wherein a final twist number of the reinforcing cord is in a range of 0.5 to 10 times/25 mm.

9. The rubber belt according to claim 1, wherein a surface of the reinforcing cord is covered with rubber.

10. The rubber belt according to claim 1, wherein the coating layer is formed using a treatment solution containing a rubber latex and a mixture of an initial condensate of resorcinol and formalin.

* * * * *